United States Patent Office 3,277,554
Patented Oct. 11, 1966

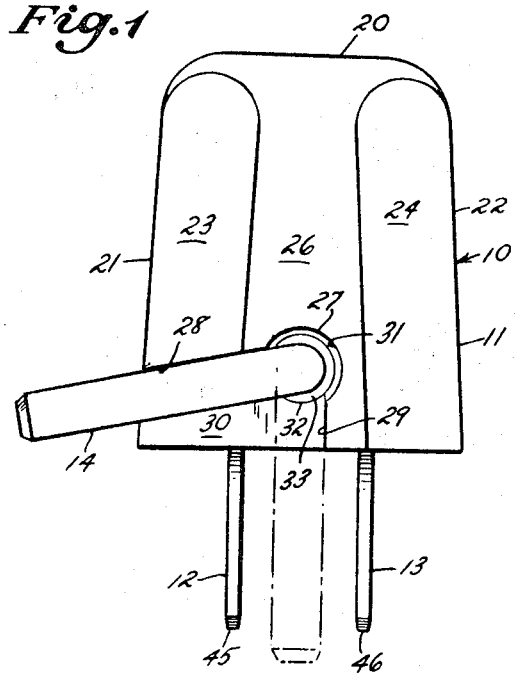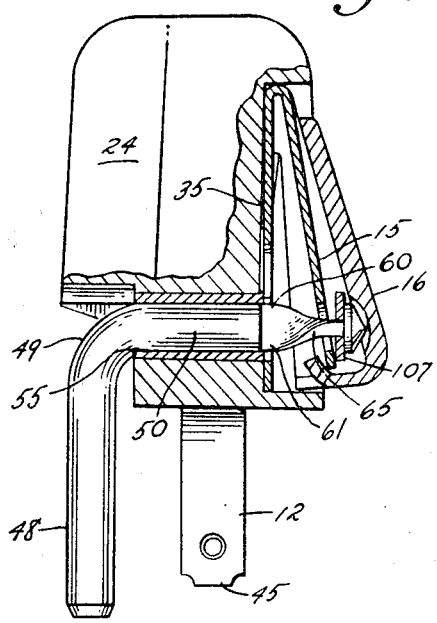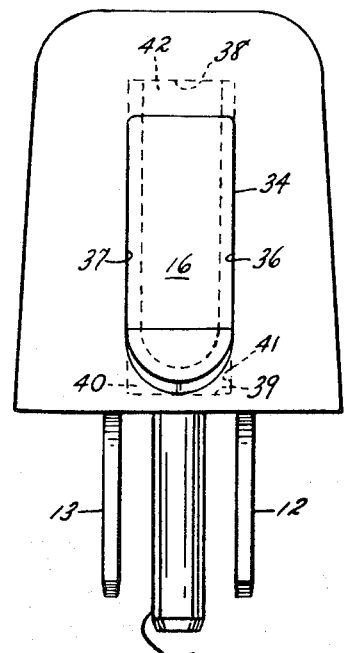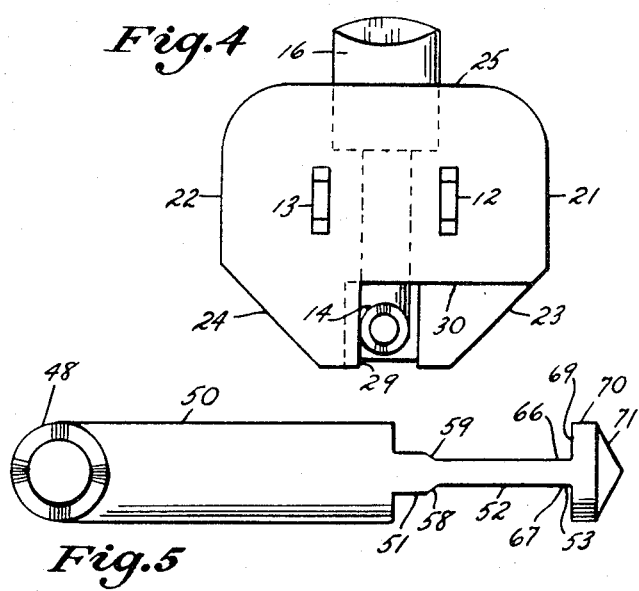

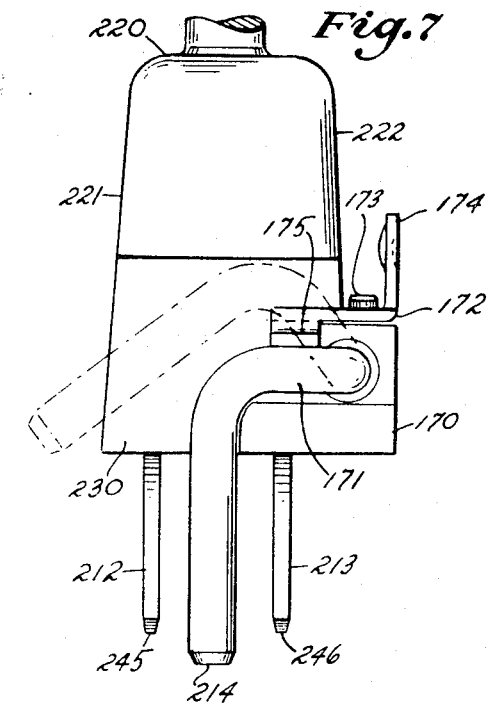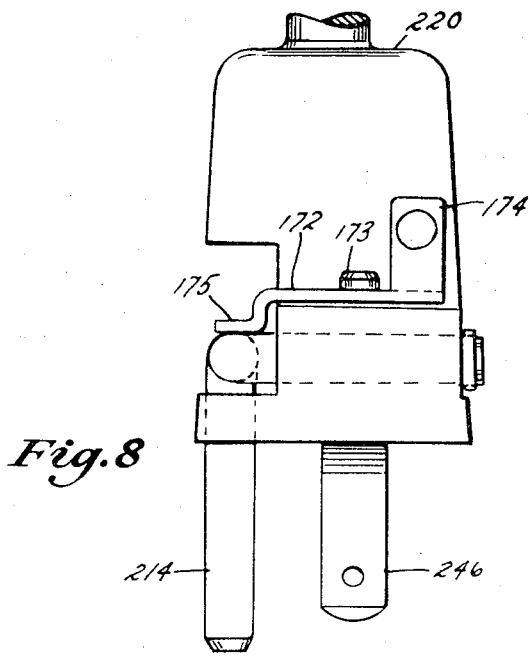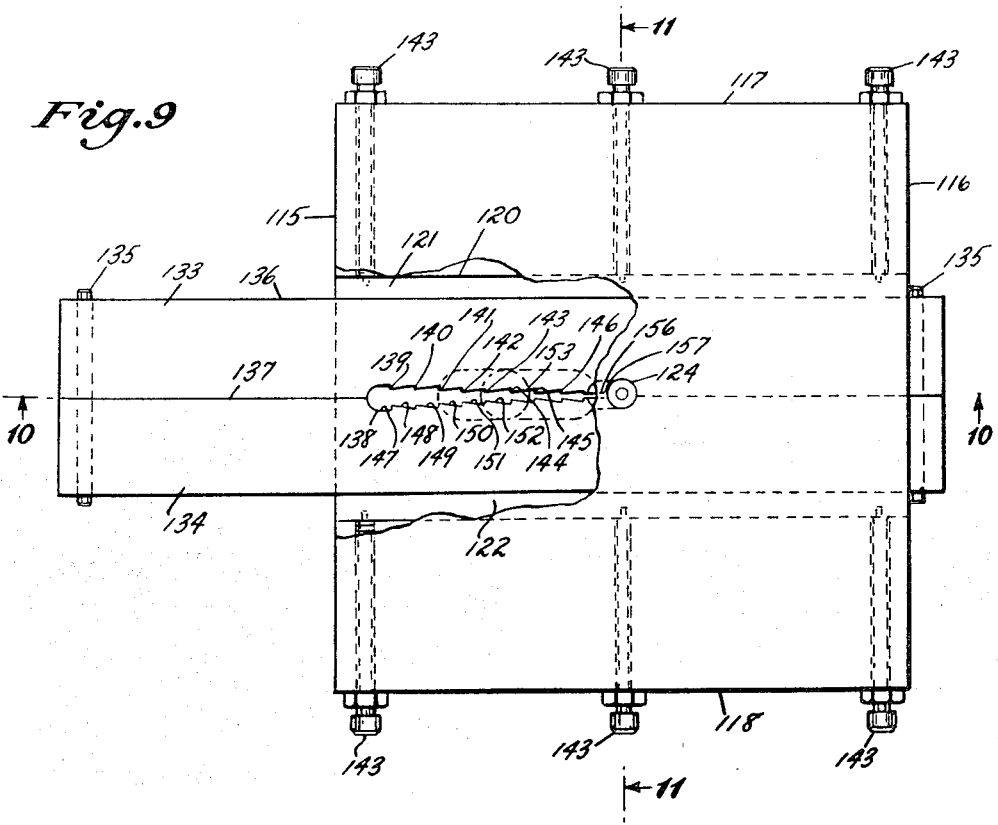

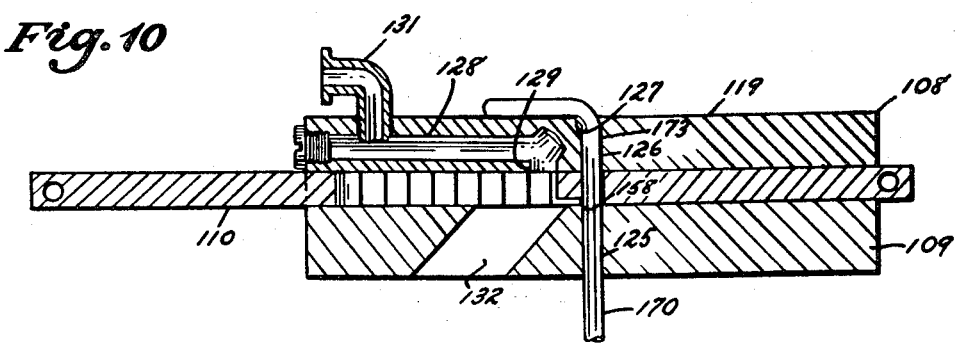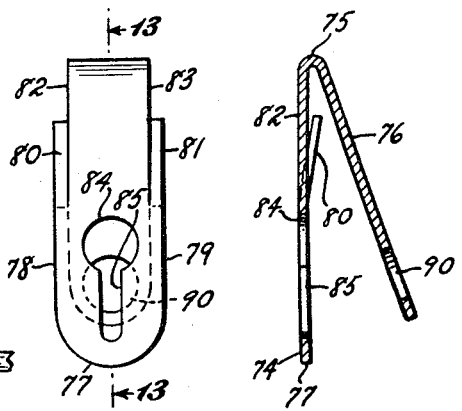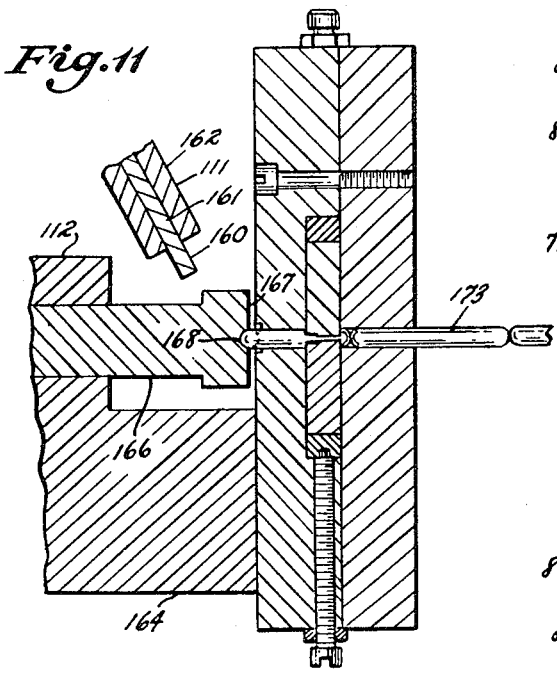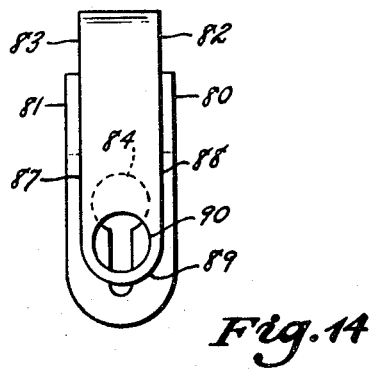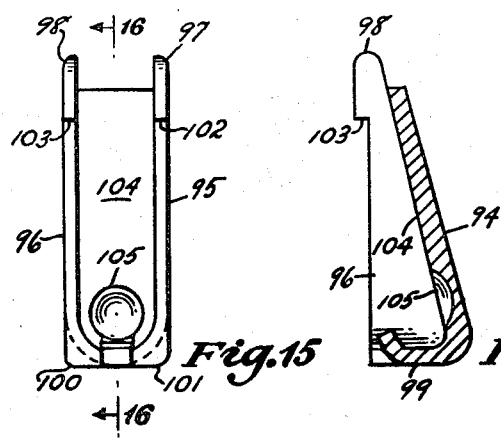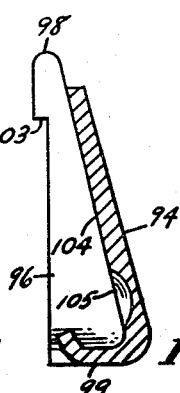

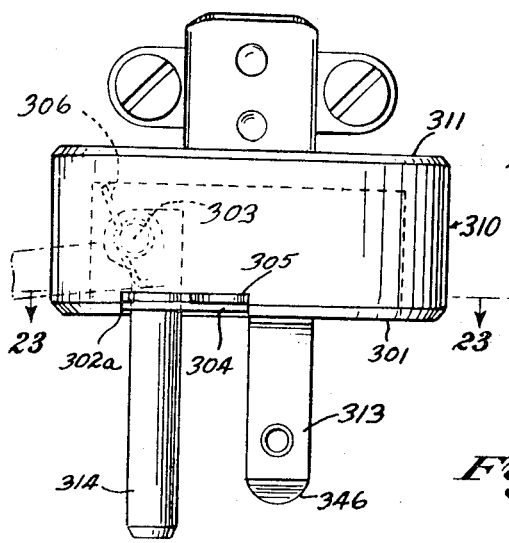
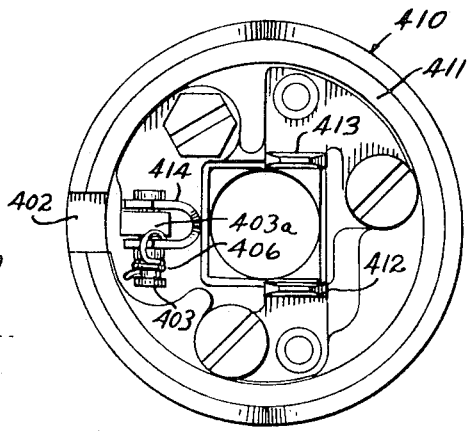
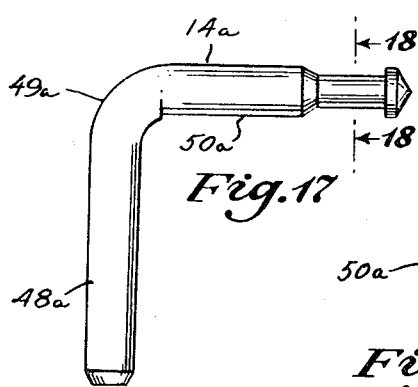
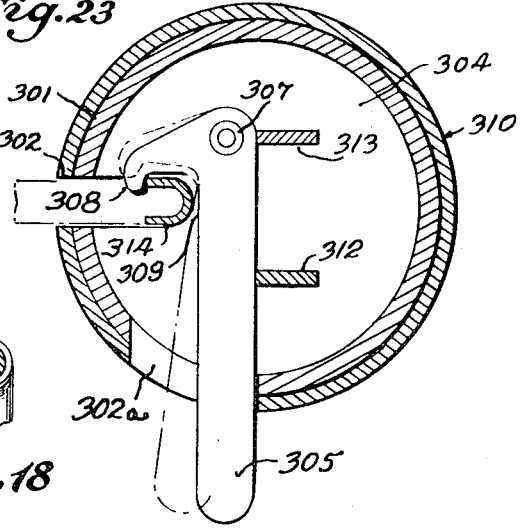
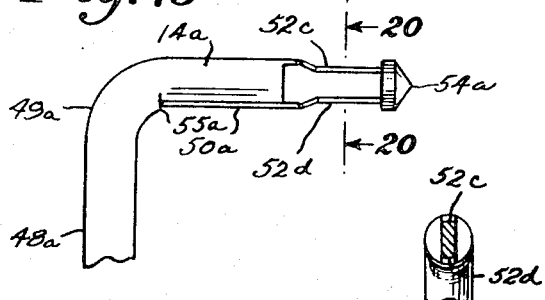
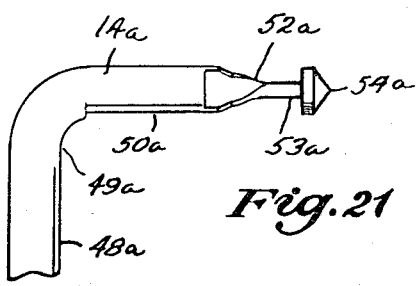

3,277,554
MANUALLY RELEASABLE GROUNDING ELECTRICAL PLUG AND MEANS FOR MANUFACTURING SAME
Milton Morse, 1 Horizon Road, Fort Lee, N.J.
Original application July 13, 1962, Ser. No. 209,579, now Patent No. 3,178,667, dated Apr. 13, 1965. Divided and this application June 26, 1964, Ser. No. 378,174
3 Claims. (Cl. 29—33)

This application is a division of my copending application Ser. No. 209,579, filed July 13, 1962, now Patent No. 3,178,667, issued Apr. 13, 1965.

This invention relates generally to the field of grounding electrical plugs of a type employing, in addition to the normally-present power prongs, a grounding prong adapted to engage a separate portion of an electric outlet receptacle. Devices of this type are generally known in the art, and the invention lies in specific constructional details, permitting greater convenience in use together with a high degree of safety, and in a means for manufacturing the improved structure at reasonable cost.

While it is known in the art to provide a grounding blade which is pivotally mounted upon a plug body in such manner as to be deflected upon the engagement of the plug with a non-grounded receptacle, so that the blade may establish a ground with respect to the cover plate of the receptacle, such devices have not been entirely satisfactory and have failed to obtain approval of certifying agencies. Where the pivotally mounted grounding prong or blade is only resiliently urged to a position in which the same lies parallel to the power prongs, accidental contact of the fingers of the user, or other object, may readily deflect the same from a parallel relation, wherein the grounding member will not enter the grounding opening of a grounded receptacle where such receptacle is not visible to the user. Further, where the grounding blade is only resiliently maintained in operative position, it can be accidentally deflected to a degree wherein the power prongs may engage the receptacle without the grounding prong first establishing an electrical ground, either with the grounding opening of the receptacle or the face plate, thereby subjecting the user to the possibility of a severe shock.

It is therefore among the principal objects of the present invention to provide an improved grounding plug of the class described in which the above-mentioned disadvantages have been substantially eliminated.

Another object of the invention lies in the provision of an improved grounding-type plug in which the grounding blade thereof may be held rigidly in the grounding position by manually-operated mechanical latching means.

Another object of the invention lies in the provision of an improved grounding-type plug of the class described in which the latching means operates automatically to lock the blade in grounding position upon being returned from a displaced position thereto by resilient means.

Another object of the invention lies in the provision of an improved self-restoring grounding blade plug construction including a finger-operated mechanical latching means in which the manual release of the means serves to deflect the grounding blade through a small arc only, thereby assuring further deflection upon contact with the face plate of a receptacle, and preventing entry of power prongs into the receptacle prior to the establishment of a ground by the grounding blade.

Still another object of the invention lies in the provision of an improved grounding plug having a latched grounding blade, in which the latching means is electrically insulated from the grounding blade as an additional safety feature.

Yet another object of the invention lies in the provision of an improved grounding-type plug in which the grounding blade is provided with means for giving a clear indication to the user if the grounding blade has not entered a grounding hole in a receptacle.

A further object of the invention lies in the provision of an improved grounding-type plug particularly adapted for use in conjunction with hand-held electrical tools and appliances, wherein the possibility of shock to the user is greater than in the case of other appliances.

A further object of the invention lies in the provision of improved machine tool means for manufacturing a grounding electrical plug possessed of the above advantages.

A feature of the invention lies in the fact that a single resilient component may be employed to provide both grounding blade return and locking function.

Another feature of the invention lies in the fact that the disclosed embodiments may be manufactured at least partially as tool machine operations, thereby maintaining the cost of production at reasonable levels, comparable with that of existing prior art devices.

These objects and features, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIGURE 1 is a side elevational view of a first embodiment of the invention.

FIGURE 2 is a longitudinal central sectional view thereof partly in elevation.

FIGURE 3 is a side elevational view thereof, showing the side opposite that seen in FIGURE 1.

FIGURE 4 is a bottom plan view thereof.

FIGURE 5 is a view in elevation of a grounding blade element which comprises a part of the first embodiment, prior to complete forming thereof.

FIGURE 6 is a similar view in elevation of the grounding blade element in fully formed condition.

FIGURE 7 is a side elevational view of a second embodiment of the invention.

FIGURE 8 is a side elevational view of the second embodiment, as might be seen from the right-hand portion of FIGURE 7.

FIGURE 9 is a fragmentary plan view, partially broken away to show detail, of a device for forming the grounding blade element of the first embodiment.

FIGURE 10 is a longitudinal central sectional view as seen from the plane 10—10 in FIGURE 9.

FIGURE 11 is a fragmentary longitudinal sectional view as seen from the plane 11—11 in FIGURE 9.

FIGURE 12 is a view in elevation showing a resilient element comprising a part of the first embodiment.

FIGURE 13 is a longitudinal central sectional view as seen from the plane 13—13 in FIGURE 12.

FIGURE 14 is a view in elevation as might be seen from the right-hand portion of FIGURE 13.

FIGURE 15 is a view in elevation of a cover element comprising a part of the first embodiment.

FIGURE 16 is a longitudinal central sectional view of the cover element as seen from the plane 16—16 in FIGURE 15.

FIGURE 17 is an elevational view of a modification of the grounding blade element 14, during one step in fabrication.

FIGURE 18 is a sectional view as seen from the plane 18—18 on FIGURE 17.

FIGURE 19 is an elevational view corresponding to FIGURE 17, but showing an ensuing step in fabrication.

FIGURE 20 is a sectional view as seen from the plane 20—20 on FIGURE 19.

FIGURE 21 is an elevational view showing the modification of FIGURE 17 in finished condition and form.

FIGURE 22 is an elevational view of a plug showing a third embodiment of the invention.

FIGURE 23 is a sectional view as seen from the plane 23—23 on FIGURE 22.

FIGURE 24 is a bottom plan view of a plug showing a fourth embodiment.

In accordance with the first embodiment of the invention, the device, generally indicated by reference character 10, comprises broadly: a plug body element 11; first and second power prongs 12 and 13, respectively; a grounding blade element 14; a resilient cam element 15; and an insulative cover or button element 16.

The plug body element 11 is preferably of molded rubber construction, although if desired the same may be also formed from phenolic resins and similar substances. It is bounded by an upper surface 20, side surfaces 21, 22, 23, 24, 25 and 26. Extending inwardly into the body element from the surface 26 is a recess 27 bounded by first, second and third planar surfaces 28, 29 and 30, respectively, and a cylindrical surface 31 disposed coaxially with respect to a transversely disposed bore 32 which extends completely through the body element 11. The bore 32 is lined with a brass or other conductive bushing 33, and is connected to a grounding conductor (not shown) in well-known manner.

Disposed opposite the recess 27 is an elongated recess 34 bounded by a bottom surface 35, side surfaces 36 and 37, and end surfaces 38 and 39. Disposed at the upper periphery of the recess 34 are lip members 40, 41 and 42, which serve to retain the cover element 16 in position, as will more fully appear.

The first and second power prongs 13 and 14, respectively, are of conventional construction, and may be embedded within the plug body 11 at the time the latter is molded. The outer ends 45 and 46 project outwardly a distance less than the distance the grounding blade element 14 projects when in aligned position with respect to the principal axes of the power prongs 12 and 13, so as to assure that a ground will be established before the outer ends 45 and 46 contact the corresponding contacts within the openings in an electric receptacle.

With reference to FIGURES 5 and 6, the grounding blade element 14 is formed from a readily machined electrical conductive material such as brass, and includes a receptacle-engaging member 48, a curved member 49, a transversely disposed cylindrical member 50, an axially aligned member of rectangular cross section 51, a spiral member 52, a second member of rectangular cross section 53, and a button or terminal 54.

The curved member 49 is formed in such a manner as to include a small shelf 55 which serves the function of positioning the transversely disposed cylindrical member 50 within the bushing 33.

The member 51 is, as has been mentioned, axially aligned with respect to the axis of the member 50, and is bounded by first and second planar surfaces 56 and 57, tapered surfaces 58 and 59, and arcuate surfaces 60 and 61 which are continuations of the outer surface of the member 50.

The spiral member 52 is bounded by two arcuate surfaces 62 and 63, and spiral surfaces 64 and 65. As best seen from a consideration of FIGURE 5, it will be observed that the thickness of the spiral member 52 is substantially less than that of the member 51 for reasons which will more clearly appear. The member 53 includes first and second planar surfaces 66 and 67, and may be of the same thickness as the member 52. The button or terminal 54 is bounded by a radial surface 69, a cylindrical surface 70, and conical surface 71.

With reference to FIGURES 12 to 14, inclusive, the resilient cam element 15 is preferably formed as a stamping, from brass or other resilient material, and includes a base member 74, a connecting bend portion 75, and a resiliently flexing member 76. The base member 74 is bounded by a curvilinear edge 77, outer side edges 78 and 79, from which depend resilient tabs 80 and 81, and inner side edges 82 and 83. Extending through the plane of the base member 74 is a circular opening 84 with which a slotted opening 85 communicates.

The resilient flexing member 76 is bounded by side edges 87 and 88, as well as a curvilinear edge 89. It is provided with a circular opening 90, the dimensions of which are similar to those of the opening 84, being of sufficiently large diameter to permit passage of the button or terminal 54.

With reference to FIGURES 15 and 16, the cover or button element 16 is preferably formed from synthetic resinous material so as to possess the quality of electrical insulation. It includes an outer wall 94, side walls 95 and 96, having first and second tabs 97 and 98 thereon, and a curved end wall 99 having third and fourth tabs 100 and 101 thereon. At the narrower end of the side walls 95 and 96 are notches 102 and 103 formed by the tabs 97 and 98, respectively, the notches 102 and 103 being adapted to engage the ends of the tabs 80 and 81 during assembly. The undersurface 104 of the outer wall 94 is provided with a circular recess 105 adapted to engage the conical surface 71 of the button or terminal 54.

During assembly, the grounding blade element 14 is inserted into the bushing 33 so that the terminal 54 projects outwardly into the recess 34. The cam element 15 is then positioned within the recess 34 in such manner that the slotted opening 85 engages the spiral member 52, the terminal 54 projecting through both the opening 84 and the opening 90. The cam element 15 is maintained in position by slipping a small split washer 107 to engage the radial surface 69, and prevent passage again through the circular openings. Following this, the cover element 16 is positioned in such manner that the tabs 100 and 101 are disposed beneath the lip members 40 and 41, and the tabs 97 and 98 beneath the lip member 42, respectively.

In engaging the device 10 within a receptacle, where a grounding prong opening is present, the resilient force of the cam member 15 will retain the grounding blade element 14 in locked condition wherein the receptacle-engaging member 48 is axially aligned parallel to the power prongs 12 and 13. When in this locked condition, it cannot be manually moved out of aligned condition without depressing the cover element 16. Where the outlet receptacle does not have a grounding prong opening, the user will not be able to insert the plug without first unlocking the grounding blade element 14 by pressing inwardly on the cover element 16. Upon the exertion of pressure, the imparted motion is transmitted through the slotted opening 85 to the spiral member 52, to result in deflecting the grounding blade element 14 through a small arc, preferably under thirty degrees. The blade will remain in deflected condition for so long as pressure is maintained upon the cover element 16. During this slight deflection, owing to the fact that the grounding blade element 14 is of greater length than the power prongs 12 and 13, the grounding blade element 14 will not be deflected a distance sufficient to permit the power prongs 12 and 13 to contact the outlet prior to the grounding blade element making contact with the face plate of the receptacle to establish a ground, thereby preventing all possibility of a shock being transmitted to the user. This degree of deflection is sufficient to permit continued further deflection upon striking of the face plate, to a degree sufficient to permit the power prongs to be fully seated within the receptacle.

Upon removal of the plug from the receptacle, the resilient cam element 15 returns to its unstressed condition, and in doing so transmits motion to the grounding blade element 14 to return it to aligned condition with respect to the power prongs. Following the reaching of an aligned condition, the slotted opening 85 engages the member 51 to lock the grounding blade element 14 in aligned condition until pressure again is applied to the cover element 16.

In the modification of the grounding blade element shown in FIGS. 17–21, to avoid repetition, corresponding parts are given the same reference character with the suffix "a." Element 14a differs in that the portion which forms the spiral member 52a during the process of fabrication is first reduced in diameter (FIGS. 17 and 18); then the flats are milled (FIGS. 19 and 20); and are finally twisted. The reduced distance between the edges 52c and 52d, requires less stretching of said edges during twisting, resulting in a smoother superior spiral member.

Referring now to FIGURES 9, 10 and 11, there is illustrated a device 108 for conveniently manufacturing the grounding blade element 14 on a mass production basis. The device 108 comprises broadly a base element 109, a shaving or broaching element 110, a bending element 111, and a twisting element 112.

The base element 109 is generally rectangular in configuration, and is bounded by a lower surface 114, side surfaces 115, 116, 117 and 118, and an upper surface 119. Extending between the side surfaces 115 and 116 is a rectangular channel 120 having aligning bars 121 and 122 bordering the sides thereof, the bars 121 and 122 being axially aligned by adjusting means 143. A vertical bore 124 extends between the lower surface 114 and upper surface 119, and has a principal axis substantially perpendicular to the principal axis of the channel 120. The bore 124 includes a lower portion 125 which receives material moving outwardly from a screw machine (not shown) and an upper portion 126 which supports the stock being worked upon. A recess 127 communicates with the upper portion 126, and provides for the formation of the shelf 55.

Disposed within the upper portion of the base element 109 is a horizontal channel 128 and a vertical channel 129 which supplies a mixture of air and oil to the rectangular channel 120. This continuous flow is provided by an inlet fitting 131, and, as chips are collected from the broaching element 110, they are conducted down a channel 132 away from the location of machining.

The shaving or broaching element 110 is best seen from a consideration of FIGURES 9 and 10, and includes first and second broaching bars 133 and 134, respectively, interconnected by pin means 135 which serve to limit the path of travel of the broaching element 110 with respect to the base element 109. Each of the bars 133–134 is bounded by an outer edge 136 and an inner edge 137, and when interconnected by the pin means 135 form a first terminal opening 138, and a plurality of jags 139, 140, 141, 142, 143, 144, 145 and 146; between which are disposed relief portions 147, 148, 149, 150, 151, 152, 153, 154 and 155. Adjacent the jag 146 are a pair of longitudinally arranged surfaces 156 and 157, which lead to a second circular terminal 158. It will be observed that the terminal openings 138 and 158 are sufficiently large to completely overlie the area of the vertical bore 124, so that stock may be freely moved within the bore 124 when the broaching element 110 is at either end of its rectilinear path of travel.

The bending element 111 may consist of an angularly-mounted plunger 160 sliding in the groove or channel 161 of a support 162, the lower end of the plunger being positioned to pass through the axis of the vertical bore 124.

The twisting element 112 (FIGURE 11) includes a fixed member 164 which may be secured to the upper surface 119 of the base element 109, and a plunger 166, the lower surface 167′ of which is provided with a groove 168 corresponding to the cross section of the stock employed to form the grounding blade element 14.

In operation, bar stock, generally indicated by reference character 170, may be partially machined in a screw machine (not shown) to form the conical surface 71, and a chamfered surface 72 at an opposite end thereof. Individual segments 173 are fed through the lower portion 125 of the bore 124 to the position shown in FIGURE 11, while the broaching element 110 is in its rightwardmost position as seen from FIGURE 9. Positioning of the segment is determined by contact of the upper end thereof with the bending 111. At this point, the broaching element 110 is moved leftwardly as seen in FIGURES 9 and 10, to form the members 51, 52 and 53. When the broaching element 110 has reached the position in which the surfaces 156 and 157 engage the now-formed member 51, the segment is locked against rotation, and the bending element 111 is now moved to form the receptacle-engaging member 48. Following this, the twisting element 112 is engaged as shown in FIGURE 11, and rotated through a ninety degree arc to shape the spiral member 52. As this twisting operation will cause some foreshortening of the spiral member 52, accommodation is made by providing a small recess 175. Upon completion of the twisting operation, the broaching element 110 is then moved to its leftwardmost limit as seen in FIGURES 9 and 10, thus permitting the now-formed element 14 to be removed and the broaching element 110 returned to its initial rightward position, following which the above-described operation may be repeated.

Turning now to the second embodiment of the invention, as illustrated in FIGURES 7 and 8 of the drawings, parts corresponding to those of the principal embodiment have been designated by similar reference characters with the additional prefix "2."

The second embodiment of the invention differs from the first embodiment in the provision of an off-set portion 170 of the plug body which supports the grounding blade element 214. The grounding blade element 214 includes an off-set portion 171, contacted selectively by a pivotally-mounted latch member 172 mounted for rotation upon a stud 173. The latch member 172 includes a finger-engaging portion 174 and a contact portion 175. Pressure exerted inwardly against the portion 174 causes the latch member 172 to pivot counterclockwise as seen in FIGURES 7 and 8, whereby the grounding blade element 214 is released to permit it to be moved to the position in dash lines in FIGURE 7. To return and lock the element 214, it is necessary only to turn the latch member 172 to the position shown in full lines in FIGURES 7 and 8. As is the case in the first embodiment, this construction permits the locking of the blade element in a position in which the receptacle-engaging portion thereof lies parallel to the principal axis of the power prongs.

In the third embodiment of the invention shown in FIGURES 22 and 23, certain of the parts are given reference characters corresponding to the principal embodiment with the prefix "3" added.

The body 311 at the rim 301 is provided with a notch 302 within which the element 314 may swing about its pivotal connection 303 to the body 311. The pivotal connection 303 may be substantially the same as that shown in FIGURE 24, wherein the element 314 is normally urged to a position parallel to the blade 313 by a spring 306.

The lower end of the body 311 (as viewed in FIG. 22) is provided with an insulating closure 304 preferably in the form of a perforated fiber disc upon the upper surface of which is mounted a lever 305 pivotally connected by a hollow rivet 307. The lever 305 acts as a movable latching and deflecting means which at the latching portion thereof has a hook 308 and opposite the element 314 has a deflecting portion 309, the handle portion projecting outward of the rim 301 through a recess 302a. As shown in the full lines in FIGURE 23, deflection of the element 314 is arrested by hook 308. When it is desired to deflect the blade, the handle portion of lever 305 is shifted to the left (clockwise in FIGURE 23) to its dot-dash line position, which pulls hook 308 out of the way and partially deflects element 314 by contact at portion 309. The remainder of the shifting of element 314 is accomplished by its engagement with the face plate of the electrical receptacle (not shown). Upon removal of the plug 310 from said receptacle, the spring 306 pulls it back to the original full line position shown in FIGURES 22 and 23.

Turning to the fourth embodiment, again certain of the parts are given similar reference characters with the prefix "4." Plug 410 is substantially identical with plug 310 except that the movable latching and deflecting means (lever 305) is absent with a loss of its function. Deflection of the element 414 is obtained manually, the element 414, when shifted, being angularly disposed with respect to a plane passing through the pair of blades 412 and 413 as it pivots about the connector 403 which may take the form of a rivet in an upstanding lug bearing 403a.

I wish it to be understood that I do not consider the invention limited to the precise details of structure shown and set forth in this specification, for obvious modifications will occur to those skilled in the art to which the invention pertains.

I claim:

1. A device for forming and shaping electrical grounding blades, comprising: a base element having an elongated channel therein, said channel having a principal axis, an elongated broaching element slidably disposed within said channel and having an elongated broaching means thereon, there being a cylindrically-shaped channel in said base element, the axis of which is substantially perpendicular to said principal axis of said elongated channel, and intersecting the path of travel of said broaching means, said broaching means having first and second terminals, each of which completely clears said cylindrically-shaped channel when disposed directly in line therewith, whereby stock material to be cut may be inserted through said cylindrically-shaped channel during the period in which said first terminal is aligned with said cylindrically-shaped channel, and removed when said second terminal is aligned with said cylindrically-shaped channel.

2. A device for forming and shaping electrical grounding blades, comprising: a base element having an elongated channel therein, said channel having a principal axis, an elongated broaching element slidably disposed within said channel and having an elongated broaching means thereon, there being a cylindrically-shaped channel in said base element, the axis of which is substantially perpendicular to said principal axis of said elongated channel, and intersecting the path of travel of said broaching means, said broaching means having first and second terminals, each of which completely clears said cylindrically-shaped channel when disposed directly in line therewith, whereby stock material to be cut may be inserted through said cylindrically-shaped channel during the period in which said first terminal is aligned with said cylindrically-shaped channel, and removed when said second terminal is aligned with said cylindrically-shaped channel; said broaching area including means adjacent one of said terminals for preventing rotational movement of a portion of material stock engaged therewith.

3. A device for forming and shaping electrical grounding blades, comprising: a base element having an elongated channel therein, said channel having a principal axis, an elongated broaching element slidably disposed within said channel and having an elongated broaching means thereon, there being a cylindrically-shaped channel in said base element, the axis of which is substantially perpendicular to said principal axis of said elongated channel, and intersecting the path of travel of said broaching means, said broaching means having first and second terminals, each of which completely clears said cylindrically-shaped channel when disposed directly in line therewith, whereby stock material to be cut may be inserted through said cylindrically-shaped channel during the period in which said first terminal is aligned with said cylindrically-shaped channel, and removed when said second terminal is aligned with said cylindrically-shaped channel; said broaching area including means adjacent one of said terminals for preventing rotational movement of a portion of material stock engaged therewith, and means for twisting a second portion of stock axially displaced with respect to said first-mentioned portion of stock.

No references cited.

RICHARD H. EANES, JR., *Primary Examiner.*